United States Patent
Wimböck

(10) Patent No.: US 10,264,451 B2
(45) Date of Patent: Apr. 16, 2019

(54) NETWORK ACCESS SUPPORT

(71) Applicant: GIESECKE+DEVRIENT MOBILE SECURITY GMBH, München (DE)

(72) Inventor: Ulrich Wimböck, Tutzing (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/557,246

(22) PCT Filed: Mar. 9, 2016

(86) PCT No.: PCT/EP2016/000424
§ 371 (c)(1),
(2) Date: Sep. 11, 2017

(87) PCT Pub. No.: WO2016/142064
PCT Pub. Date: Sep. 15, 2016

(65) Prior Publication Data
US 2018/0063713 A1    Mar. 1, 2018

(30) Foreign Application Priority Data

Mar. 11, 2015    (DE) .................. 10 2015 003 079

(51) Int. Cl.
*H04W 8/18*    (2009.01)
*H04L 29/12*    (2006.01)
(Continued)

(52) U.S. Cl.
CPC ......... *H04W 12/06* (2013.01); *H04L 61/6054* (2013.01); *H04L 63/0853* (2013.01); *H04W 8/18* (2013.01)

(58) Field of Classification Search
CPC ... H04W 8/18; H04L 61/6054; H04L 63/0853
See application file for complete search history.

(56) References Cited

U.S. PATENT DOCUMENTS 8,688,076 B2    4/2014 Helmreich
2009/0253409 A1*    10/2009 Slavov ................ H04L 63/0823
                                                           455/411
(Continued)

FOREIGN PATENT DOCUMENTS

DE    102010043878 A1 *    5/2010
DE    102010043878 A1    5/2012
(Continued)

OTHER PUBLICATIONS

"3rd Generation Partnership Project; Technical Specification Group Services and System Aspects; Feasibility Study on the Security Aspects of Remote Provisioning and Change of Subscription for Machine to Machine (M2M) equipment, (Release 9)," 3rd Generation Partnership Project, vol. 9, No. 2, Jun. 22, 2016, pp. 1-88.

(Continued)

*Primary Examiner* — Asghar H Bilgrami
(74) *Attorney, Agent, or Firm* — Workman Nydegger

(57) ABSTRACT

In order to support the access of a terminal to a mobile communication network, a network subscriber identifier and a plurality of authentication data sets relating to this network user identifier are transferred to the terminal by an access support server. The plurality of authentication data sets are generated previously by a server of the mobile communication network, after the access support server has transmitted the network subscriber identifier to the server. In order to check an authentication information item of the terminal upon logging into the mobile communication network, an authentication server of the mobile communication network transmits an authentication data set from the plurality of authentication data sets, for example via the server.

15 Claims, 5 Drawing Sheets

(51) Int. Cl.
*H04L 29/06* (2006.01)
*H04W 12/06* (2009.01)

(56) References Cited

U.S. PATENT DOCUMENTS

| | | | | |
|---|---|---|---|---|
| 2011/0255509 A1* | 10/2011 | Huang | .................. | H04W 48/20 |
| | | | | 370/331 |
| 2012/0122423 A1 | 5/2012 | Helmreich | | |
| 2013/0331063 A1* | 12/2013 | Cormier | .............. | H04L 63/0272 |
| | | | | 455/411 |
| 2014/0335825 A1* | 11/2014 | Babbage | ............ | H04L 63/0853 |
| | | | | 455/411 |
| 2015/0105049 A1* | 4/2015 | Golaup | ............... | H04L 63/0892 |
| | | | | 455/411 |

FOREIGN PATENT DOCUMENTS

| | | | |
|---|---|---|---|
| DE | 102013013178 A1 | | 2/2015 |
| EP | 2182750 A1 | * | 5/2010 |
| EP | 2182750 A1 | | 5/2010 |
| WO | 2011158207 A1 | | 12/2011 |

OTHER PUBLICATIONS

"Embedded SIM Remote Provisioning Architecture," GSM Association, URL: http://www.gsma.com/connectedliving/wp-content/uploads/2014/01/1.GSMA-Embedded-SIM-Remote-Provisioning-Architecture-Version-1.1.pdf, Version 1.1, Dec. 17, 2013, pp. 1-84.
German Search Report from DE Application No. DE102015003079.5, dated Oct. 14, 2015.
International Search Report from PCT Application No. PCT/EP2016/000424, Jun. 9, 2016.

* cited by examiner

FIG 3
Authentication of the terminal (under a selected subscription) vis-à-vis a mobile communication network (home network or foreign network):
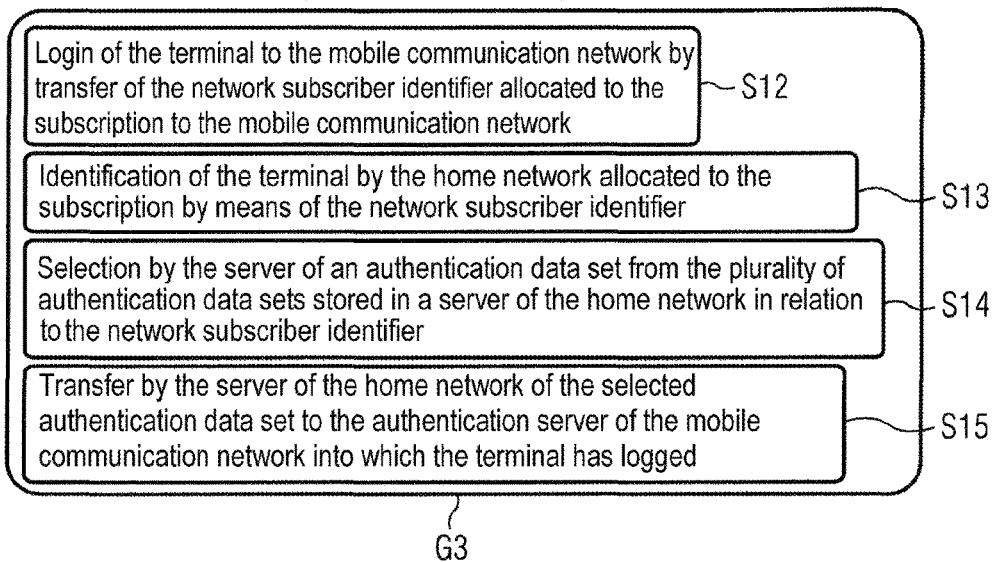
G3
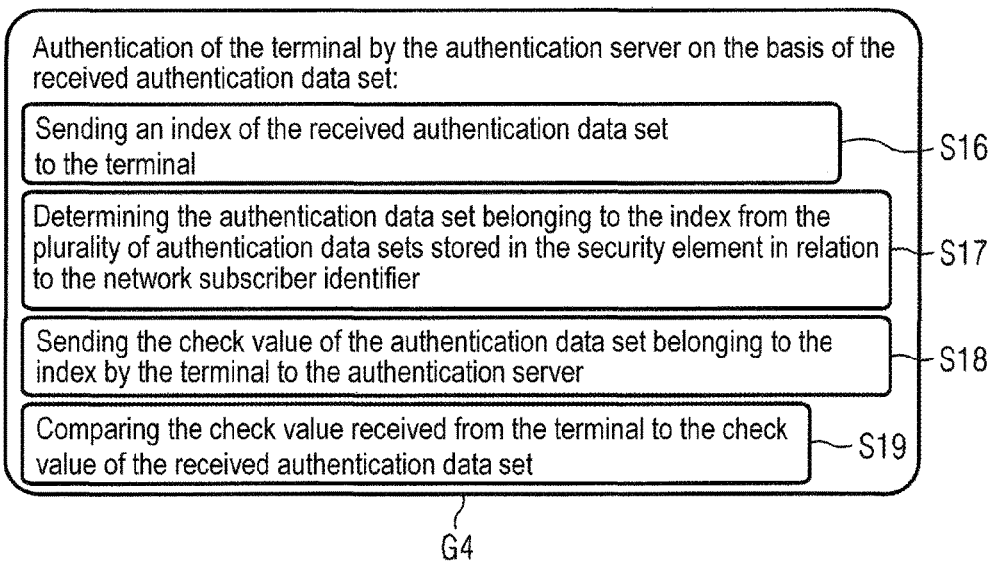
G4

NETWORK ACCESS SUPPORT

BACKGROUND

The present invention relates to a method for supporting an access of a terminal to a mobile communication network. The invention further relates to a security element for a terminal with a corresponding access support application, a corresponding access support server and a system with such a security element and such an access support server.

The authentication of a terminal of a subscriber vis-à-vis a mobile communication network for access to the mobile communication network is currently effected usually through a so-called challenge-response method. Therein, after the subscriber by means of a network subscriber identifier stored on a security element (SIM, UICC) of the terminal and transferred to the server of the mobile communication network, the terminal receives a random number from the server, encrypts this random number by means of a subscriber-specific and secret authentication key stored in the terminal, and transfers the result to the server. There, the authentication key of the subscriber is stored likewise, so that the server can perform the computation in turn and compare the result with the result received from the terminal. If the results match the terminal is considered authenticated.

The explicit secure storing of such authentication keys or comparable data sets required for determining authentication data in the security element of the terminal involves some disadvantages. Usually, an authentication key is firmly tied to a subscription, i.e. a contractual agreement of the subscriber with an operator of the mobile communication network. Therefore, it is difficult to support a merely temporary use of a subscription or the parallel use of different subscriptions on a security element with the described solution. Generally, the so-called "life cycle management" of the security element is made more difficult when authentication keys or the like have to be stored permanently on it.

To overcome the problems mentioned solutions are known in which an authentication key or comparable data are no longer stored locally in the security element of the terminal, but on an external server, for example a so-called SIM server (see e.g. WO 2011/158207 A1). During authentication of the terminal vis-à-vis the mobile communication network, the terminal then forwards the random number received from the server of the mobile communication network to the SIM server. There the random number is encrypted by means of the secret key allocated to the subscriber, which is now stored at the SIM server and no longer in the security element of the terminal. The result is transferred by the SIM server to the terminal and forwarded by the terminal to the server of the mobile communication network. In this manner, the explicit storing of authentication keys or the like in the security element of the terminal can be omitted. It is also made possible to use different subscriptions in parallel or individual subscriptions only temporarily.

A disadvantage of the solution described last is, however, that the terminal of the subscriber always has to establish a connection to the SIM server for authentication vis-à-vis the mobile communication network. This means that the SIM server must be available to the terminal reliably and permanently. Also, it is necessary that the communication connection between the terminal and the SIM server reliably enables a data communication with sufficient speed. Otherwise timing specifications of the authentication process between the terminal and the server of the mobile communication network possibly cannot be observed.

SUMMARY

Accordingly, it is the object of the present invention to address the described problems of the state of the art and to propose a method and a system which support an authentication of a terminal vis-à-vis a mobile communication network.

A preferred embodiment of a method in a system comprising a first server of a mobile communication network and an access support server connected to the first server comprises the steps described in the following.

In the first server of the mobile communication network, a plurality of authentication data sets is generated for a predetermined network subscriber identifier. The first server can correspond to a server of a "home location register" (HLR) of the mobile communication network. As network subscriber identifier for example an IMSI ("international mobile subscriber identity"—in connection with a GSM network)—or an IMPI ("IP multimedia private identity"—in connection with an IP-based network) can be used. The generation of the authentication data, which will be specified more precisely in the following, can depend on an authentication key allocated to the network subscriber identifier which is then stored in a secure manner in the first server.

The first server stores the plurality of authentication data sets generated in relation to the predetermined network subscriber identifier and transfers a copy of the plurality of authentication data sets to the access support server.

For example, in response to an authentication request of a terminal for authentication vis-à-vis a mobile communication network, then, in a further step, an authentication information item of a terminal to which the predetermined network subscriber identifier is assigned, is checked by an authentication server of the mobile communication network by means of a selected authentication data set from the plurality of authentication data sets. As "authentication information item" generally such a data set is understood in connection with the invention which the terminal sends to the authentication server of the mobile communication network in order to authenticate itself.

The method is characterized in that the terminal is assigned a predetermined network subscriber identifier by the access support server. The access support server forwards this network subscriber identifier assigned to the terminal also to the first server of the mobile communication network, so that the same can generate the plurality of authentication data sets relating to the predetermined network subscriber identifier, as mentioned above. According to a preferred variant, the first server can allocate a secret authentication key already mentioned above to the predetermined network subscriber identifier, transmitted to it, said authentication key serving to generate the plurality of authentication data sets and being stored at the first server of the mobile communication network together with the network subscriber identifier.

The access support server also forwards a copy of the plurality of authentication data sets received from the first server to the terminal. In the terminal this plurality of authentication data sets can be stored together with the predetermined network subscriber identifier received in the step of assigning, for example in a security element of the terminal.

For the step of checking the authentication information of the terminal by the authentication server of the mobile communication network, at least the selected authentication data set relating to the predetermined network subscriber identifier is provided to the authentication server of the mobile communication network, either by the first server or the access support server. Further, the authentication server receives the authentication information from that terminal to which the predetermined network subscriber identifier has been assigned in the step of assigning, and to which the copy of the plurality of authentication data sets has been forwarded in the step of forwarding.

The terminal can consequently authenticate itself vis-à-vis an authentication server of a mobile communication network according to the above-described method solely on the basis of the network subscriber identifier previously assigned by the access support server and the received plurality of authentication data sets. The preparatory steps, i.e. assigning the network subscriber identifier and transferring the plurality of authentication data sets from the access support server to the terminal, require merely a one-time data communication between the access support server and the terminal. This data communication can be effected via any data communication network and at any time. At the time at which the terminal authenticates itself vis-à-vis a mobile communication network, fundamentally no data communication is required any more between the terminal and the access support server. In this manner, an access of the terminal to the mobile communication network is made possible in a simple manner.

Usually, a subscriber who seeks access to one or several mobile communication networks will register once with the access support server in advance. Therein, the identity of the subscriber is ascertained and access data are incorporated in a security element of the terminal of the subscriber, which can be used subsequently by the terminal in order to effect an authentication vis-à-vis the access support server. Such a step of authentication of the terminal vis-à-vis the access support server will usually be effected prior to the step of assigning the predetermined network subscriber identifier to the terminal.

In the access support server one or several subscriptions can be created for the once registered subscriber. A subscription here corresponds substantially to a contractual relationship between the subscriber and an operator of a mobile communication network, which is technically managed by the access support server, and which regulates the access of the terminal to a mobile communication network allocated to the subscription. A specific network subscriber identifier is preferably assigned to each such subscription.

It follows directly that by means of the method described above a subscription can be used also merely temporarily or in parallel to further subscriptions in a simple manner and managed by the access support server. On the corresponding terminal of the subscriber or in the security element of the terminal, it is possible to store and manage different network subscriber identifiers in secure manner and in parallel, said identifiers in each case together with one of the plurality of authentication data allocated to the network subscriber identifier. For this purpose an application support application described in detail below can be installed on the security element. When the subscriber now wishes to gain access to a mobile communication network by means of his terminal, in case that several subscriptions have been created for the subscriber, he can, by means of the access support application, select manually or automatically, in accordance with presettable criteria, a subscription, i.e. also a mobile communication network as home network.

In a first preferred variant of the method, the first server of the mobile communication network, which usually corresponds to the home network of the currently selected subscription, provides the authentication server of that mobile communication network into which the terminal has logged with the selected authentication data set. After the terminal has logged into the mobile communication network, vis-à-vis which it wants to authenticate itself, for example by transferring the network subscriber identifier assigned to the terminal, the mobile communication network identifies the terminal by means of the network subscriber identifier, possibly after consultation with the corresponding home network.

On the basis of this network subscriber identifier the first server of the home network allocated to the subscription can now retrieve the plurality of authentication data sets stored in relation to the network subscriber identifier and select one authentication data set therefrom. This selected authentication data set is then transferred to the authentication server of the mobile communication network into which the terminal has logged. This can be an authentication server of the home network or an authentication server of a foreign network.

According to a second preferred variant of the method, the access support server can provide the corresponding authentication server of the mobile communication network into which the terminal has logged with the authentication data set for the step of checking the authentication information of the terminal. In a certain sense, in this second preferred variant the access support server plays the role of the first server in the above-described first preferred variant.

For this purpose the access support server is adapted to detect an authentication request of the terminal to a mobile communication network. By means of the network subscriber identifier transferred during the login, the access support server can retrieve the plurality of authentication data sets stored in relation to the transferred network subscriber identifier, and likewise select one authentication data set therefrom. This selected authentication data set is then forwarded by the access support server to the corresponding authentication server. The authentication server can be arranged either in the home network allocated to the subscription or in a foreign network.

According to a further preferred embodiment of the method, the access support server can function as a personalization unit for a terminal. In the step of assigning, the terminal is assigned a temporary, initial network subscriber identifier by the access support server. The first server of the mobile communication network, which serves as home network in this case, generates at least some authentication data sets for the initial, temporary network subscriber identifier. Upon a first activation in the mobile communication network, the terminal can then make a first authentication request to the mobile communication network on the basis of the initial, temporary network subscriber identifier. This first authentication request usually serves to gain access to the mobile communication network, in order to obtain one or several conventional network subscriber identifiers via this access. In other words, the terminal or the security element of the terminal is personalized for the actual operation only after the one-time access to the mobile communication network.

An authentication data set mentioned multiple times above can fundamentally be configured in any desired suitable manner. Preferably, such an authentication data set consists of a data set pair, consisting of an index and a check value allocated to the index. The index here serves to uniquely identify the authentication data set among the plurality of authentication data sets. The check value serves for the terminal to authenticate itself vis-à-vis the authentication server and the check value serves for the authentication server to authenticate the terminal. The index and the check value can also be regarded as "challenge" and "response" here.

Fundamentally, for authentication vis-à-vis the authentication server, the terminal can merely transfer the check value allocated to the index as authentication information in response to a received index. However, it is also possible that, in response to a received index, the terminal computes an authentication information item by means of the check value allocated to the index and transfers this authentication information to the authentication server for authentication.

A preferred embodiment of a security element for a terminal comprises an access support application for supporting an access to at least one mobile communication network. The access support application is adapted therein to carry out an authentication of the security element vis-à-vis an access support server. For this purpose the security element can comprise corresponding access data, for example access keys, which have been introduced into the security element within the framework of a registration of the security element with the access support server.

The access support application is further adapted to receive from an access support server and to manage in secure manner a network subscriber identifier and a plurality of authentication data sets relating to this network subscriber identifier. Usually such a receipt of corresponding data will be preceded by a request by the access support application to the access support server, in which these data are requested.

The access support application is finally adapted, on the basis of the network subscriber identifier and the plurality of authentication data sets of the security element, to authenticate the terminal vis-à-vis a mobile communication network in the manner described above, in order to thereby obtain access to the mobile communication network.

The security element can in principle be permanently installed in the terminal, for example in the form of a so-called "trusted execution environment" (TEE), or as a security element that is removably integrated in the terminal, for example as a secure memory card or the like.

The access support application can further be adapted to receive from the access support server and to simultaneously manage in a secure fashion several different network subscriber identifiers, and respectively a plurality of authentication data sets relating to each of these network subscriber identifiers. Further, the access support application can be adapted to authenticate itself vis-à-vis several different mobile communication networks on the basis of these different network subscriber identifiers and the plurality of authentication data sets respectively allocated to the different network subscriber identifiers. In this manner, the parallel use of different subscriptions is supported by the terminal.

A preferred embodiment of an access support server for supporting a security element of a terminal when accessing a mobile communication network is preferably adapted to be connected to a first server of the mobile communication network and to authenticate a security element of a terminal in a manner described above. The access support server is further adapted to allocate a network subscriber identifier to the security element, and to forward the network subscriber identifier to the first server.

From the first server, the access support server can then receive a plurality of authentication data sets relating to the network subscriber identifier, and can transfer this plurality of authentication data sets together with the network subscriber identifier to the security element of the terminal. Preferably, the access support server is further adapted to store also itself the plurality of authentication data sets relating to the previously forwarded network subscriber identifier received from the first server, together with the network subscriber identifier.

According to a preferred variant, the access support server is further adapted to assign different network subscriber identifiers to the security element of the terminal and to forward respectively one of the different network subscriber identifiers to a first server of a mobile communication network from a number of different mobile communication networks. Consequently, the access support server is further adapted to transfer to the security element of the terminal and to also store itself a plurality of authentication data sets respectively received by any one of the first servers in relation to the network subscriber identifier forwarded to the first server, together with the network subscriber identifier forwarded to the first server.

A preferred variant of a system according to the invention finally comprises at least a mobile communication network, an above-described security element for a terminal with an access support application of the type described, an access support server described above, each of which are adapted to carry out a method described above.

BRIEF DESCRIPTION OF THE DRAWINGS

The present invention will be described hereinafter by way of example with reference to the attached drawings. The figures are described as follows:

FIG. 3 steps of the method for supporting an access to a mobile communication network, comprising a login of the terminal to the mobile communication network and an authentication of the terminal by an authentication server.

DETAILED DESCRIPTION OF VARIOUS EMBODIMENTS

Figure 1:
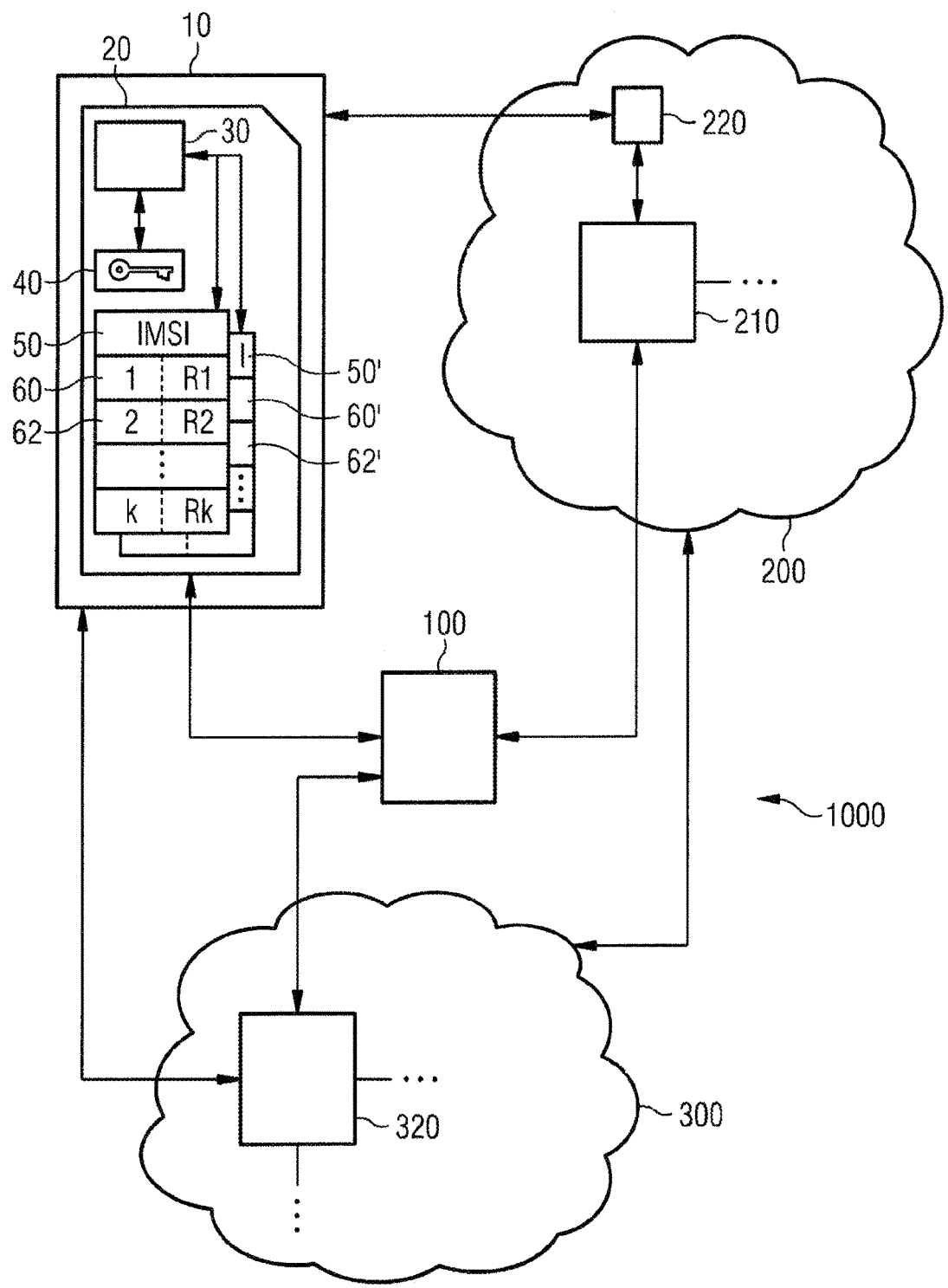
FIG. 1 Components of a preferred embodiment of a system according to the invention, FIG. 2 preparatory steps of a preferred embodiment of a method for supporting an access to a mobile communication network, comprising a registration of a terminal with an access support server and an authentication of the terminal vis-à-vis the access support server, wherein the terminal is prepared for authentication vis-à-vis a mobile communication network.

A system 1000, which is shown schematically in FIG. 1, comprises a first mobile communication network 200, a further mobile communication network 300, an access support server 100 and a terminal 10.

The terminal 10 comprises a security element 20. The security element 20 comprises an access support application 30 described in detail in the following. Said application is adapted to retrieve authentication data 40, by means of which the terminal 10 can authenticate itself vis-à-vis the access support server 100. The access support application 30 is further adapted to retrieve network subscriber identifiers 50, 50' (e.g. an IMSI) stored in the terminal 10, as well as authentication data sets 60, 60' respectively allocated to a network subscriber identifier 50, 50' in the manner described below.

The network subscriber identifier 50 and the plurality of authentication data sets 60, in the manner likewise described below, serve for an authentication of the terminal 10 vis-à-vis a mobile communication network 200, 300.

Each of the network subscriber identifiers 50, 50' stored in the security element 20 of the terminal 10 is allocated to a subscription, i.e. a contractual obligation of the user of the terminal 10 vis-à-vis an operator of a mobile communication network 200, 300. In the method described below, the mobile communication network 200 is presumed to be the home network relating to the subscription, to which the network subscriber identifier 50 is allocated. Consequently, the mobile communication network 300 has to be regarded as a foreign network for this subscription.

The mobile communication network 200 comprises a first server 210. The first server 210 can be a server of a home location register (HLR) of the mobile communication network 200, for example. The first server 210 is adapted, in relation to a predetermined network subscriber identifier 50 which the first server 210 can receive from the access support server 100, as described below, to generate a plurality of authentication data sets 60, for example in the form of "challenge-response" pairs, and to store them together with the individual network subscriber identifier 50. The server 210 is further adapted to transfer the generated plurality of authentication data sets 60 to the network support server 100.

The network support server 100 in turn is adapted to store the received plurality of authentication data sets 60 together with the corresponding network subscriber identifier 50 and to transfer a copy of the plurality of authentication data sets 60 together with the network subscriber identifier 50 to the terminal 10.

The mobile communication network 200 and the mobile communication network 300 further each include an authentication server 220, 320, which are adapted to authenticate a terminal 10 on the basis of a previously received authentication data set. Details of a corresponding method will now be set out in the following with reference to FIGS. 2 to 5.

Figure 2:
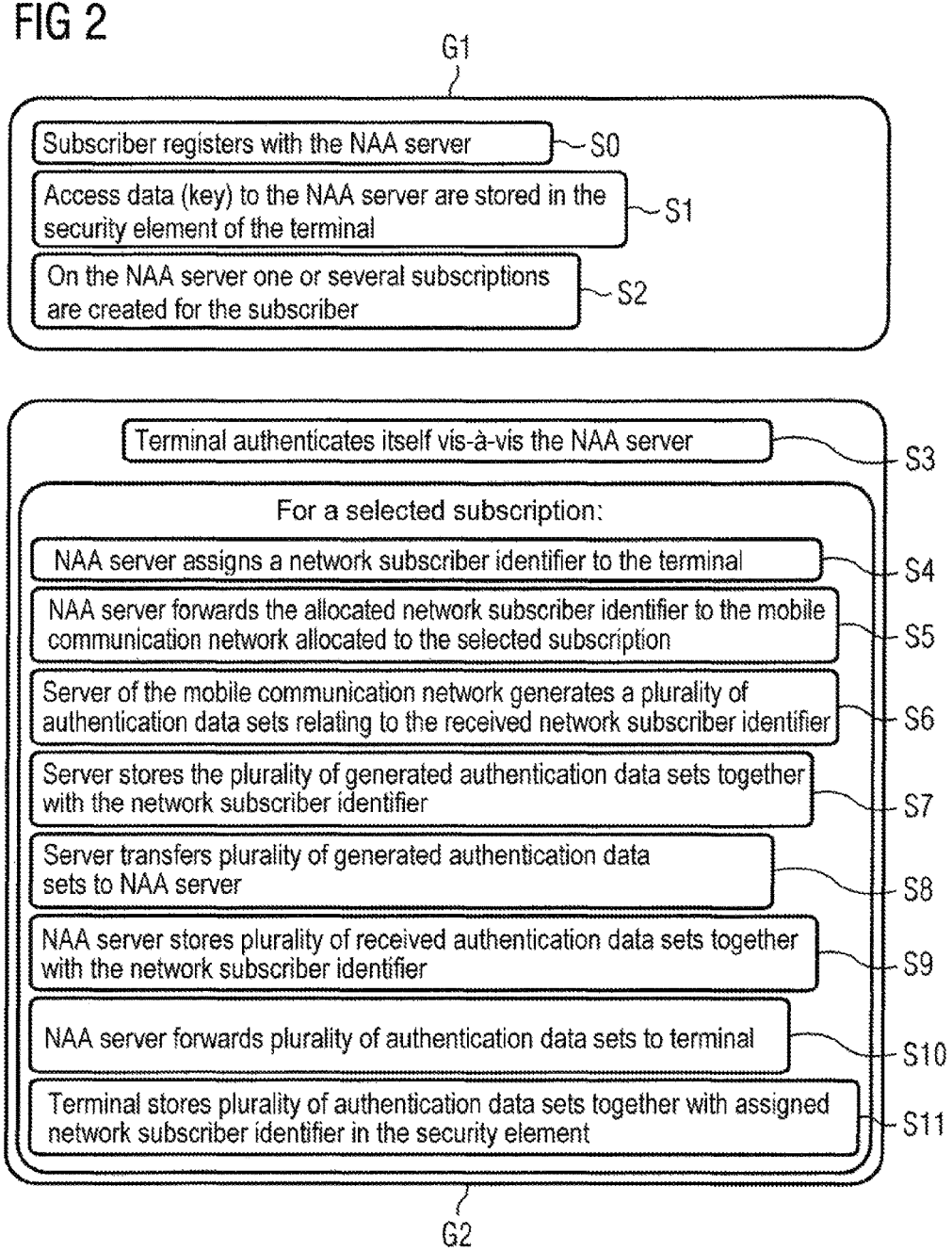

In FIG. 2, steps are described which are to be carried out in preparation in order to enable a terminal 10 to access a mobile communication network 200, 300. Steps S0 to S2 of the group G1 serve to register a terminal 10 or a security element 20 of the terminal 10 with an access support server 100 (NAA server "network access application" server).

The steps S3 to S11 of the group G2 then serve to prepare the terminal 10 for a login to a mobile communication network 200, 300 through the access support server 100.

In step S0 a subscriber, that is a user of a terminal 10, registers with the access support server 100. Usually the identity of the subscriber is ascertained by an operator of the access support server 100.

In step S1 access data, preferably an access key 40 (see FIG. 1), are stored in the security element 20 of the terminal 10. On the basis of these access data 40 the terminal 10 can authenticate itself vis-à-vis the access support server 100, as indicated in step S3.

In step S2 finally one or several subscriptions are created for the subscriber in the access support server 100. Each of these subscriptions substantially corresponds to a contractual agreement with respect to a use of a mobile communication network 200, 300 by the subscriber by means of the terminal 10.

After successful registration, the terminal 10 can authenticate itself vis-à-vis the access support server 100, as specified in step S3. A secure data communication connection can be established between the terminal 10 or the security element 20 of the terminal 10 and the access support server 100.

For each subscription created in step S2 then the steps S4 to S11 can be carried out.

In step S4, the access support server 100 assigns a network subscriber identifier 50 relating to the selected subscription to the terminal 10. Such a network subscriber identifier 50 can correspond to an IMSI that is known from the GSM field, for example. However, this network subscriber identifier is allocated to the terminal 10 by the access support server 100 only temporarily, i.e. for the duration of the subscription. When the contractual relationship expires, the network subscriber identifier 50 can be re-used by the access support server 100, and can for example be assigned to a different subscriber/terminal.

In step S5 the access support server 100 forwards the network subscriber identifier 50 assigned to the terminal 10 to the mobile communication network 200 allocated to the selected subscription, which is to be regarded as the home network relating to the subscription.

The first server 210 of the home network 200 in step S6 generates a plurality of authentication data sets relating to the received network subscriber identifier. For this purpose, the server 210 can allocate an authentication key stored at the server 210 to the network subscriber identifier 50. This authentication key can then be used for generating the plurality of authentication data sets 60.

In step S7, the server 210 stores the plurality of generated authentication data sets 60 together with the previously received network subscriber identifier 50.

The server 210 in step S8 transfers the plurality of generated authentication data sets 60 to the access support server 100, which in step S9 likewise stores these together with the network subscriber identifier 50.

In step S10 the access support server 10 forwards a copy of the plurality of authentication data sets 60 to the terminal 10. The terminal 10 in step S11 stores the plurality of the received authentication data sets 60 together with the assigned network subscriber identifier 50 in the security element 20.

The terminal 10 is now fully adapted to authenticate itself vis-à-vis a mobile communication network 200, 300. Such an authentication process is described below with reference to FIG. 3.

The steps of the authentication process are again divided into two groups G3 and G4. The steps of the group G3 specify how the terminal 10 logs into the mobile communication network 200, 300 and how the authentication server of the mobile communication network 200, 300 receives the authentication data set on the basis of which it authenticates the terminal 10.

The steps of the group G4 finally describe a specific embodiment of an authentication process between the terminal 10 and the authentication server 220, 320.

In step S12 the terminal 10 logs into the mobile communication network 200, 300 by transferring to the mobile communication network 200, 300 the network subscriber identifier 50 of the currently selected subscription. The mobile communication network 200, 300 here can correspond to the home network 200 or a foreign network 300. The terminal 10 is identified by the mobile communication network 200, 300 in step S13 by means of the received network subscriber identifier 50. In the event that the terminal has 10 logged into a foreign network 300, the foreign network 30 fetches corresponding information from the home network 200 in a manner that is known in principle.

The home network 200 allocated to the subscription, i.e. the first server 210 of the home network 200, which is notified in any case of the login of the terminal 10 to the mobile communication network 200, 300, in step S14 selects an authentication data set 62 from the plurality of authentication data sets 60 stored in relation to the network subscriber identifier (see FIG. 2, step S7).

In step S15, the first server 210 of the home network 200 transfers the selected authentication data set 62 to the authentication server 220, 320 of the mobile communication network 200, 300 into which the terminal 10 has logged.

The respective authentication server 220, 320 is now in a position to authenticate the terminal 10, as described below with reference to steps S16 to S19.

For this purpose, the authentication server 220, 320 in step S16 sends the index of the received authentication data set to the terminal 10. The authentication data set here comprises an index and a check value allocated to the index.

In step S17 the terminal 10 determines the authentication data set 62 belonging to the index from the plurality of authentication data sets stored in the security element 20 of the terminal 10 in relation to the network subscriber identifier 50 (see FIG. 2, step S11).

In step S18, the terminal 10 sends the check value of the authentication data set belonging to the index to the authentication server 220, 320. Said server in step S19 finally compares the check value received from the terminal 10 to the check value of the authentication data set 62 received from the first server 210 in step S15. If the two check values match, the terminal 10 is considered authenticated successfully.

Figure 4:
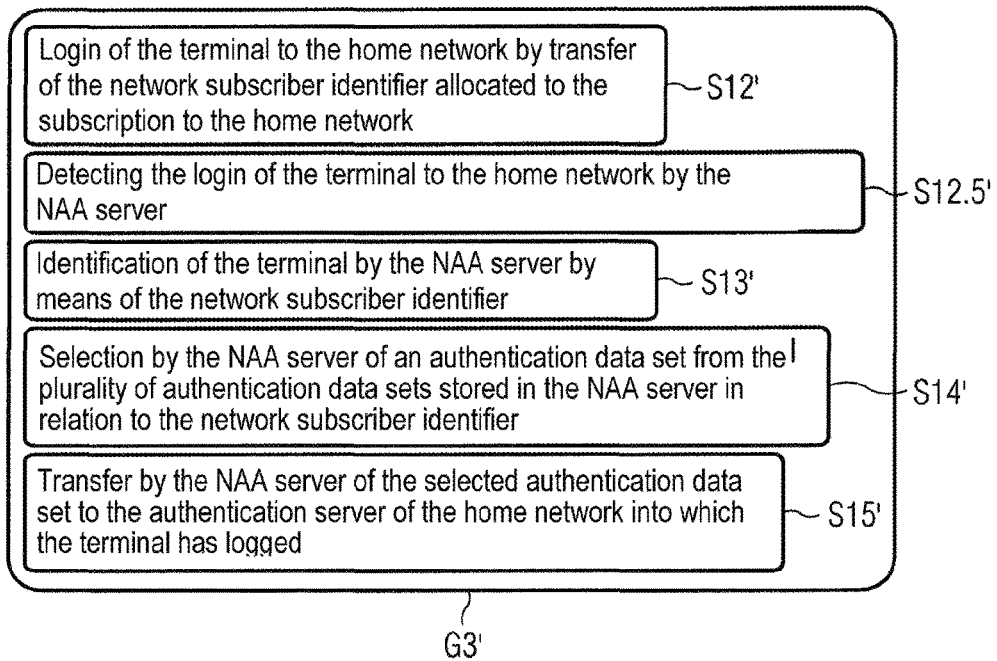
FIGS. 4 and 5 variants of the method according to FIG. 3

The method represented in FIG. 4 is very similar to the method of FIG. 3. In contrast to the method of FIG. 3 an authentication of the terminal 10 according to the method in FIG. 4 is effected explicitly vis-à-vis the home network 200.

The substantial difference of the method according to FIG. 4 in comparison to the method of FIG. 3 is that instead of the first server 210 of the mobile communication network 200, it is the access support server 100 which selects the authentication data set 62 used for authenticating the terminal 10 and sends it to the authentication server 220.

This is made possible by the fact that the access support server 100 is adapted, as shown with reference to step S12.5', to detect a login of the terminal 10 to the home network 200, for example by means of the network subscriber identifier 50 transferred to the home network 200 by the terminal 10. In a manner that is known in principle, the access support server 100 can tap and/or intercept the corresponding data exchange. By means of this network subscriber identifier 50 the access support server 100, as shown with reference to step S13', can identify the terminal 10 and in step S14' select an authentication data set 62 from the plurality of authentication data sets 60 stored in the access support server 100 in relation to the network subscriber identifier 50 (see FIG. 2, step S9).

In step S15', the access support server 100 transfers the selected authentication data set 62 to the authentication server 220 of the home network 200.

The steps of the group G4 of the method according to FIG. 4 are then carried out analogously to the method of FIG. 3, and are therefore not explained in detail.

Figure 5:
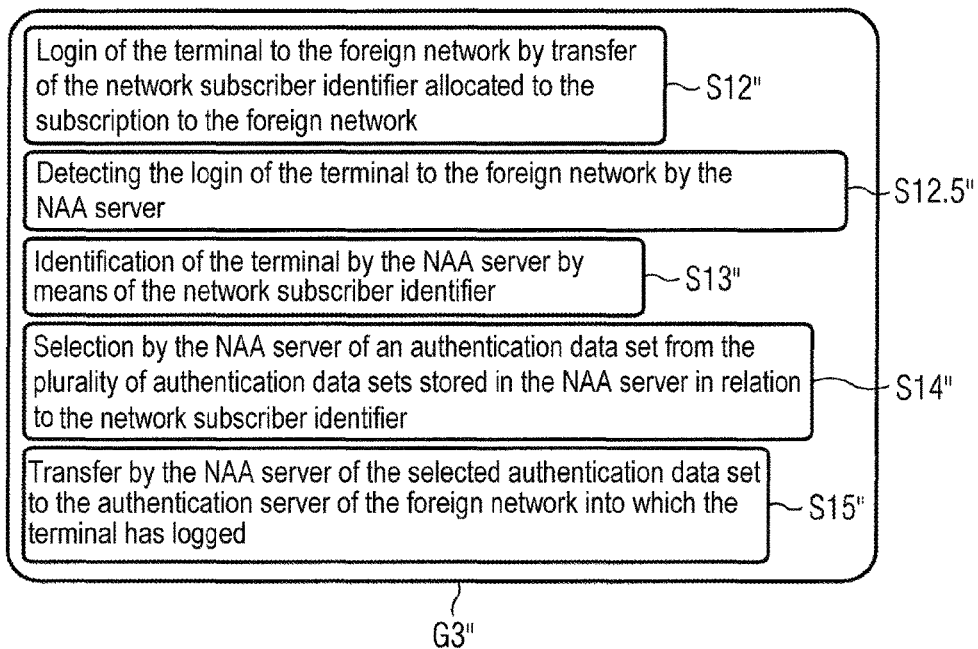

The method according to FIG. 5 differs from the method of FIG. 4 substantially merely in that the terminal 10 does log into the home network 200, but into a foreign network 300.

The access support server 100 is likewise adapted, as indicated in step S12.5'', to detect such a login of the terminal 10 to a foreign network 300 and to identify the terminal 10 on the basis of the network subscriber identifier 50 transferred to the foreign network 300. In a manner that is known in principle, the access support server 100 can tap and possibly intercept the corresponding data exchange.

The remaining steps of the method according to FIG. 5 are carried out analogously to the method of FIG. 4, with the difference that the access support server 100 does not transfer the selected authentication data set 62 to the authentication server 220 of the home network 200, but to an authentication server 320 of the foreign network 300.

The invention claimed is:

1. A method in a system comprising a first server of a mobile communication network, an access support server, an authentication server, the first server and the authentication server being separate servers that are both part of the mobile communication network, and a terminal that communicates with the mobile communication network, the first server being communicatively coupled to the access support server and the authentication server and the terminal being communicatively coupled to the access support server and the authentication server, wherein the method comprises the following steps of:
   generating, in the first server, a plurality of authentication data sets for a predetermined network subscriber identifier and storing, in the first server, the plurality of authentication data sets relating to the predetermined network subscriber identifier;
   transferring the plurality of authentication data sets from the first server to the access support server;
   assigning, by the access support server, a predetermined network subscriber identifier to the terminal;
   forwarding the plurality of authentication data sets from the access support server to the terminal; and
   checking, by the authentication server, an authentication information item of the terminal with the predetermined network subscriber identifier by means of a selected authentication data set from the plurality of authentication data sets,
   wherein, the authentication information item of the terminal is provided by the first server to the authentication server with at least the selected authentication data set received from the access support server, and the authentication server receives from the terminal the authentication information item to which the predetermined network subscriber identifier has been assigned and to which the plurality of authentication data sets has been forwarded by the access support server.

2. The method according to claim 1, wherein the further step of authenticating the terminal vis-à-vis the access support server prior to the step of assigning the predetermined network subscriber identifier to the terminal.

3. The method according to claim 1, wherein for the step of checking the authentication information of the terminal, the first server provides the authentication server with at least the selected authentication data set.

4. The method according to claim 1, wherein the step of checking the authentication information of the terminal, the access support server provides the authentication server with at least the selected authentication data set.

5. The method according to claim 4, wherein the access support server detects an authentication request of the terminal to a mobile communication network by means of the predetermined network subscriber identifier and in response, for the step of checking the authentication information of the terminal, provides an authentication server of the mobile communication network as the authentication server with the selected authentication data set.

6. The method according to claim 5, wherein the access support server detects an authentication request of the terminal to a home network by means of the predetermined network subscriber identifier and in response, for the step of checking the authentication information of the terminal, provides the authentication server of the home network with the selected authentication data set.

7. The method according to claim 5, wherein the access support server detects an authentication request of the terminal to a foreign network by means of the predetermined network subscriber identifier and in response, for the step of checking the authentication information of the terminal, provides the authentication server of the foreign network with to the selected authentication data set.

8. The method according to claim 1, wherein the access support server functions as a personalization unit for a terminal and, in the step of assigning, assigns to the terminal an initial temporary network subscriber identifier, the first server generates a plurality of initial authentication data sets for the initial temporary network subscriber identifier, and the terminal, upon a first activation in a mobile communication network, makes a first authentication request to the mobile communication network on the basis of the initial temporary network subscriber identifier and the initial authentication data sets.

9. The method according to claim 1, wherein the first server of the mobile communication network is a server of a home location register of the mobile communication network.

10. The method according to claim 1, wherein, as an authentication data set, a pair of data sets is generated which consists of an index and a check value allocated to the index.

11. A security element for a terminal with an access support application for supporting an access to at least one mobile communication network;
wherein the access support application is adapted to carry out an authentication of the security element vis-à-vis an access support server;
receive from the access support server and manage in a secure manner a network subscriber identifier and a plurality of authentication data sets relating to this network subscriber identifier, the authentication data being received by the access support server from a first server of the at least one mobile communication network;
provide one or more of the plurality of authentication data sets to an authentication server with the network subscriber identifier received from the access support server, the first server and the authentication server being separate servers that are both part of the at least one mobile communication network; and
authenticate the security element vis-à-vis a mobile communication network on the basis of the network subscriber identifier and the plurality of authentication data sets.

12. The security element according to claim 11, wherein the access support application is adapted to receive from the access support server and to manage in a secure manner several different network subscriber identifiers and respectively a plurality of authentication data sets relating in each case to these network subscriber identifiers, and is adapted to authenticate itself vis-à-vis a plurality of different mobile communication networks on the basis of these different network subscriber identifiers and the several authentication data sets respectively allocated to the different network subscriber identifiers.

13. An access support server for supporting a security element in accessing a mobile communication network, wherein the access support server is adapted to
be connected to a first server and an authentication server of the mobile communication network, the first server and the authentication server being separate servers that are both part of the mobile communication network;
authenticate a security element of a terminal;
allocate to the security element a network subscriber identifier and forward the network subscriber identifier to the first server;
receive from the first server a plurality of authentication data sets relating to the network subscriber identifier; and
transfer the plurality of authentication data sets together with the network subscriber identifier to the security element of the terminal,
wherein for the step of authenticating the security element of the terminal, the authentication data sets are provided to the authentication server with the network subscriber identifier.

14. The access support server according to claim 13, wherein the access support server is adapted to allocate different network subscriber identifiers to the security element and to forward in each case one of the different network subscriber identifiers to a first server of a mobile communication network from a number of different mobile communication networks, and is adapted to transfer to the security element of the terminal a plurality of authentication data sets respectively received by one of the first servers in relation to the network subscriber identifier forwarded to the first server, together with the network subscriber identifier forwarded to the first server.

15. A system comprising a mobile communication network, a security element for a terminal, and an access support server adapted to carry out a method according to claim 1.

* * * * *